(12) United States Patent
Nagarathinam et al.

(10) Patent No.: US 11,594,079 B2
(45) Date of Patent: Feb. 28, 2023

(54) METHODS AND APPARATUS FOR VEHICLE ARRIVAL NOTIFICATION BASED ON OBJECT DETECTION

(71) Applicant: Walmart Apollo, LLC, Bentonville, AR (US)

(72) Inventors: Arun Prasad Nagarathinam, Santa Clara, CA (US); Madhavan Kandhadai Vasantham, Dublin, CA (US); Sahana Vijaykumar, Sunnyvale, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 161 days.

(21) Appl. No.: 16/684,374

(22) Filed: Nov. 14, 2019

(65) Prior Publication Data

US 2020/0193732 A1 Jun. 18, 2020

Related U.S. Application Data

(60) Provisional application No. 62/781,481, filed on Dec. 18, 2018.

(51) Int. Cl.
*G06K 9/00* (2022.01)
*G07C 5/00* (2006.01)
(Continued)

(52) U.S. Cl.
CPC .............. *G07C 5/008* (2013.01); *G06T 7/70* (2017.01); *G06T 7/97* (2017.01); *G06V 10/20* (2022.01);
(Continued)

(58) Field of Classification Search
CPC .......... G06K 9/00335; G06K 9/00624; G06K 9/00711; G06K 9/00771; G06K 9/00785; G06K 9/2054; G06K 9/3233; G06K 9/3241; G06K 9/325; G06K 9/36; G06K 9/62; G06K 9/6267; G06K 2009/3291; G06K 2209/15; G06K 2209/21; G06T 7/11; G06T 7/20; G06T 7/70; G06T 7/97; G06T 2207/10016; G06T 2207/30196;
(Continued)

(56) References Cited

U.S. PATENT DOCUMENTS

7,222,081 B1   5/2007  Sone
8,665,113 B2 * 3/2014  Arnold .................... G08G 1/04
                                                          340/933
(Continued)

*Primary Examiner* — Eric Rush
(74) *Attorney, Agent, or Firm* — Morgan, Lewis & Bockius LLP; Manita Rawat (57) ABSTRACT

A system is provided and generally includes a server and an associate computing device. The server may receive location video data comprising at least one image from a camera directed to a location, such as a designated area of a parking lot. The server may detect one or more objects in the image, and determine a bounding box based on the detected objects. The server may also determine a confidence value corresponding to the bounding box. The confidence value may be determined based on an area of the image defined by the bounding box and a predefined class. The server may then generate an arrival message based on the determined confidence value, and transmit the arrival message to the associate computing device.

20 Claims, 6 Drawing Sheets

(51) Int. Cl.
  *G06T 7/70* (2017.01)
  *G06T 7/00* (2017.01)
  *G06V 10/20* (2022.01)
  *G06V 20/52* (2022.01)
  *G06V 20/40* (2022.01)
  *G06V 10/26* (2022.01)
  *G08B 13/196* (2006.01)
  *G06V 10/62* (2022.01)
  *G06V 10/764* (2022.01)

(52) U.S. Cl.
  CPC .............. *G06V 10/26* (2022.01); *G06V 10/62* (2022.01); *G06V 10/764* (2022.01); *G06V 20/41* (2022.01); *G06V 20/44* (2022.01); *G06V 20/52* (2022.01); *G08B 13/19608* (2013.01); *G06T 2207/10016* (2013.01); *G06T 2207/30252* (2013.01); *G06V 2201/07* (2022.01); *G06V 2201/08* (2022.01)

(58) Field of Classification Search
  CPC . G06T 2207/30232; G06T 2207/30236; G06T 2207/30248; G06T 2207/30252; G06T 2207/30264; G06Q 10/0836; H04N 7/188; G08B 13/19602; G08B 13/19606; G08B 13/19608; G08B 13/1961; G08B 13/19613; G08B 13/19691; G08G 1/01; G08G 1/017; G08G 1/0175; G08G 1/04; G08G 1/123; G08G 1/127; G08G 1/14; G08G 1/141; G08G 1/142; G08G 1/149; G08G 1/20; G08G 1/207; G07C 5/008; H04W 4/021; H04W 4/40; G06V 10/20; G06V 10/22; G06V 10/25; G06V 10/26; G06V 10/62; G06V 10/764; G06V 20/41; G06V 20/44; G06V 20/52; G06V 20/54; G06V 20/58; G06V 2201/07; G06V 2201/08

USPC ........ 382/100, 103–105, 107, 115, 159, 181, 382/224, 282, 283, 291; 348/77, 118, 348/135, 143, 148–150, 152, 156, 161, 348/169; 705/5, 13, 15, 26.1, 26.35, 705/26.81; 340/425.5, 541, 573.1, 932.2, 340/933, 937, 988; 186/38, 40, 41, 52, 186/53, 59, 60; 701/465, 519, 523
See application file for complete search history.

(56) References Cited

U.S. PATENT DOCUMENTS

| | | |
|---|---|---|
| 9,741,011 B2 | 8/2017 | Beach-Drummond |
| 10,495,472 B2 | 12/2019 | Chachra et al. |
| 10,824,878 B2 * | 11/2020 | Houri ..................... G06V 20/53 |
| 2012/0030133 A1 | 2/2012 | Rademaker |
| 2013/0204719 A1* | 8/2013 | Burry ..................... G06Q 50/12 |
| | | 705/15 |
| 2014/0003725 A1* | 1/2014 | Kawano .................. G06T 7/215 |
| | | 382/203 |
| 2014/0205139 A1* | 7/2014 | Kriel .................. G06K 9/00805 |
| | | 382/103 |
| 2015/0310370 A1* | 10/2015 | Burry ................. G06K 9/00785 |
| | | 705/7.26 |
| 2015/0310459 A1* | 10/2015 | Bernal ............... G06Q 30/0201 |
| | | 705/7.29 |
| 2015/0310624 A1* | 10/2015 | Bulan ................ G06K 9/00785 |
| | | 382/103 |
| 2017/0308851 A1 | 10/2017 | Beach-Drummond |
| 2017/0308852 A1 | 10/2017 | Beach-Drummond |
| 2017/0323370 A1* | 11/2017 | Burry ....................... G06K 9/00 |
| 2018/0012463 A1* | 1/2018 | Chaudhry .......... G06K 9/00771 |
| 2018/0047193 A1* | 2/2018 | Gao ........................ G06T 7/248 |
| 2018/0158265 A1* | 6/2018 | Lyman .................. G06T 19/006 |
| 2018/0268462 A1 | 9/2018 | Brown |
| 2019/0130189 A1* | 5/2019 | Zhou ....................... G06T 7/246 |
| 2019/0130580 A1* | 5/2019 | Chen ...................... G06V 20/40 |
| 2019/0356505 A1* | 11/2019 | Madden .................. G06N 5/022 |
| 2020/0043063 A1 | 2/2020 | London |

* cited by examiner

METHODS AND APPARATUS FOR VEHICLE ARRIVAL NOTIFICATION BASED ON OBJECT DETECTION

CROSS-REFERENCE TO RELATED APPLICATIONS

This application claims priority to U.S. Provisional Application No. 62/781,481, entitled "METHOD AND APPARATUS FOR VEHICLE ARRIVAL NOTIFICATION BASED ON OBJECT DETECTION," filed on Dec. 18, 2018, the disclosure of which is incorporated herein by reference in its entirety.

TECHNICAL FIELD

The disclosure relates generally to customer service and, more specifically, to apparatus and methods for generating vehicle arrival notifications.

BACKGROUND

At least some known online retailers allow customers to place purchase orders remotely through a purchasing system. For example, some retailers use at least some known purchasing systems that allow customers to place purchase orders through the retailer's website. As another example, some retailers allow customers to place purchase orders through an application ("App") that executes on a mobile device, such as a cellular phone. Often times, the purchasing system provides an option to the customer to have the purchased items delivered to an address, such as to the customer's home address. At least some known purchasing systems, however, provide an option to allow the customer to pick up the purchased goods at a store location. For example, the customer can select a store location when making the purchase, and have the retailer gather the goods and have them ready for customer pickup. Some purchasing systems allow the customer to check-in ahead of time to let the retailer know the customer is on their way to pick up the purchased goods at a store location.

In some examples, when the customer arrives at the store, the customer parks their vehicle and walks into the store. The customer then proceeds to customer service to pick up their purchased goods. In other examples, the customer parks their vehicle at a designated parking area and waits for an associate to assist the customer with their order. These customer service experiences, however, have drawbacks. For example, the amount of time before an associate is ready to assist a customer may be substantially long. The customer may also be unaware of how long they must wait before the associate is ready to help them with their order. As such, there are opportunities to address these and other customer service experiences.

SUMMARY

In some embodiments, a system is provided that includes a server, a video camera, and a computing device. The server is configured to receive video data comprising at least one image from an imaging device, such as a video camera. The server may detect at least one object in the at least one image. The server may then determine at least one area of the at least one image based on the detected object, where the determined area includes the detected object. The server may also determine a value, such as a confidence score, corresponding to the determined area of the image based on the detected object and a predefined class. The predefined class may be vehicles, for example. The server may then generate a vehicle arrival message based on the determined value. For example, the server may generate the vehicle arrival message if the value is beyond a predefined threshold. The server may then transmit the arrival message to the computing device, which may be operated by an associate of a retailer.

In some embodiments, a method by a server includes receiving video data comprising at least one image from an imaging device. The method further includes detecting at least one object in the at least one image. The method may also include determining at least one area of the at least one image based on the detected object, where the determined area includes the detected object. The method may further include determining a value, such as a confidence score, corresponding to the determined area of the image based on the detected object and a predefined class. The method may also include generating a vehicle arrival message based on the determined value. The method may further include transmitting the arrival message to the computing device.

In some embodiments, a non-transitory, computer-readable storage medium includes executable instructions that, when executed by one or more processors, cause the one or more processors to perform operations including receiving video data comprising at least one image from an imaging device. The operations further include detecting at least one object in the at least one image. The operations may also include determining at least one area of the at least one image based on the detected object, where the determined area includes the detected object. The operations may further include determining a value, such as a confidence score, corresponding to the determined area of the image based on the detected object and a predefined class. The operations may also include generating a vehicle arrival message based on the determined value. The operations may further include transmitting the arrival message to the computing device.

BRIEF DESCRIPTION OF THE DRAWINGS

The features and advantages of the present disclosures will be more fully disclosed in, or rendered obvious by, the following detailed descriptions of example embodiments. The detailed descriptions of the example embodiments are to be considered together with the accompanying drawings wherein like numbers refer to like parts and further wherein.

DETAILED DESCRIPTION

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

The embodiments described herein may enable a retailer to be notified when a customer's vehicle arrives at a pickup location, such as at a store, to allow the retailer to service the customer as soon as possible. As such, the embodiments may allow the retailer to provide a more efficient means for a customer to pick up purchased goods from a store. For example, the systems and methods described herein may advantageously assist customers and store personnel in completing transactions for outside-store pickup transactions by decreasing customer wait times.

Figure 1:
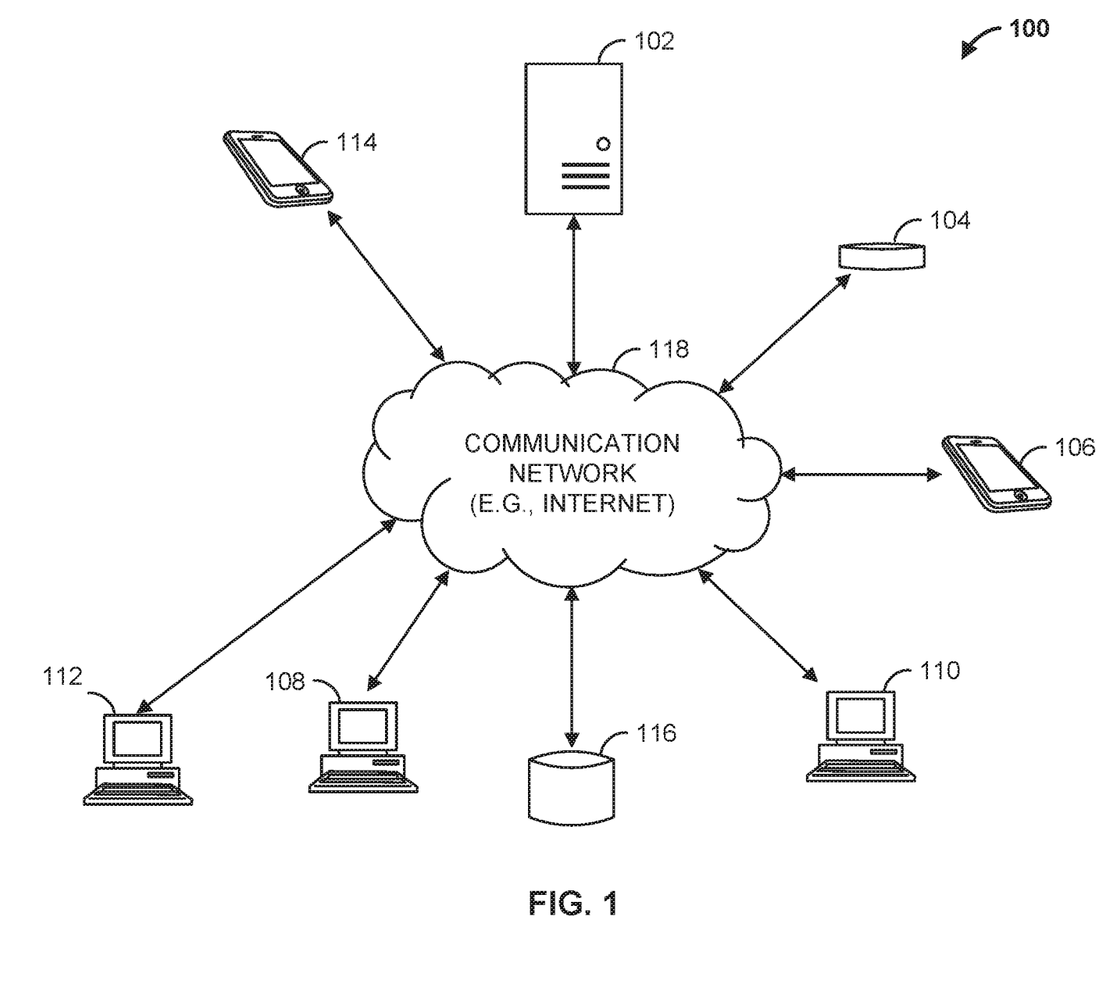
FIG. 1 is a block diagram of a system in accordance with some embodiments.

Turning to the drawings, FIG. 1 illustrates a block diagram of a vehicle notification system 100 that includes server 102, multiple customer computing devices 104, 106, 108, multiple associate computing devices 110, 112, 114, and database 116, each operably connected to network 118. Server 102, first customer computing device 104, second customer computing device 106, Nth customer computing device 108, first associate computing device 110, computing device 112, and computing device 114 can each be any suitable computing device that includes any hardware or hardware and software combination for processing data. In addition, each can transmit data to, and receive data from, network 118.

For example, each of server 102, multiple customer computing devices 104, 106, 108, and multiple associate computing devices 110, 112, 114 can be a computer, a workstation, a laptop, a mobile device such as a cellular phone, a web server, an application server, a cloud-based server, or any other suitable device. Each can include, for example, one or more processors, one or more field-programmable gate arrays (FPGAs), one or more application-specific integrated circuits (ASICs), one or more state machines, digital circuitry, or any other suitable circuitry.

Although FIG. 1 illustrates three customer computing devices 104, 106, 108, vehicle notification system 100 can include any number of customer computing devices 104, 106, 108. Similarly, although FIG. 1 illustrates three associate computing devices 110, 112, 114, vehicle notification system 100 can include any number of associate computing devices 110, 112, 114.

Server 102 can be a server operated by a retailer. Associate computing devices 110, 112, 114 can be computing devices operated by associates (e.g., employees) of the retailer. Customer computing devices 104, 106, 108 can be computing devices operated by customers of a retailer.

Server 102 is operable to communicate with database 116 over network 118. For example, server 102 can store data to, and read data from, database 116. Database 116 can be a remote storage device, such as a cloud-based server, a memory device on another application server, a networked computer, or any other suitable remote storage. Although shown remote to server 102, in some examples database 116 can be a local storage device, such as a hard drive, a non-volatile memory, or a USB stick. For example, database 116 can be a storage device local to server 102.

Network(s) 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Network 118 can provide access to, for example, the Internet.

Server 102 can also communicate with first customer computing device 104, second customer computing device 106, and Nth customer computing device 108 over network 118. Similarly, first customer computing device 104, second customer computing device 106, and Nth customer computing device 108 are operable to communicate with server 102 over network 118. For example, server 102 can receive data (e.g., messages) from, and transmit data to, first customer computing device 104, second customer computing device 106, and Nth customer computing device 108.

Server 102 is also operable to communicate with first associate computing device 110, second associate computing device 112, and Nth associate computing device 114. For example, server 102 can receive data from, and transmit data to, first associate computing device 110, second associate computing device 112, and Nth associate computing device 114.

Vehicle notification system 100 may allow for the notification of a customer's vehicle when the vehicle arrives at a predetermined location, such as a parking lot or an area outside a store designated for picking up purchased goods. As such, vehicle notification system 100 may improve the customer service experience by reducing the amount of time a customer would otherwise wait to be serviced. For example, vehicle notification system 100 may notify a retailer that a new vehicle has arrived at the predetermined location to allow the retailer to service the customer arriving in the vehicle, thereby reducing an amount of time the customer may otherwise have to wait for assistance from the retailer. an order for customer pickup for a customer when vehicle notification system 100 notifies the retailer that the customer has arrived.

For example, server 102 may be configured to receive video data including images taken from a video camera directed at a location, such as a portion of a retailer's parking lot. The location may be, for example, a designated area where customers park their vehicles to pick up previously ordered goods. Server 102 may employ a feature extractor, such as one based on neural networks or artificial intelligence (AI), to detect one or more objects in the received images. For example, server 102 may apply a feature extraction algorithm to the images to detect the objects (e.g., feature extraction), where the feature extraction algorithm may be one supported by the OpenCV library, a histogram of oriented gradients (HOG) feature extraction algorithm, or any other suitable feature extraction algorithm. Server 102 may determine a bounding box for any detected objects. For example, the bounding box may identify the location of each of the detected objects within the image. In some examples, the bounding box includes at least four coordinate points identifying an area within the image.

Server 102 may also employ a classifier, such as a random decision forest (RDF) classifier, to classify the detected objects. Server 102 may execute the classifier to classify the objects detected by the feature extractor and determine which of the detected objects are of a particular classification, such as vehicles. Server 102 may also determine a confidence value (e.g., confidence score) for the classification of each of the detected objects. For example, a high confidence value (e.g., 1, or 100%) may indicate a high likelihood that the classification of the object is correct (e.g., the object identified is a vehicle), where a low confidence value (e.g., 0, or 0%) indicates a low likelihood that the classification of the object is correct (e.g., the object identified is not a vehicle).

Based on the bounding boxes and confidence values for each of the objects identified as of a particular type (e.g., a vehicle) in an image, server 102 may filter out (e.g., remove from consideration) one or more of the objects. In some examples, if the confidence value for an object identified as a particular type is below a threshold (e.g., 60%), server 102 may filter that object out. In some examples, if the area of the image defined by a bounding box coincides with an area of the image defined by another bounding box, server 102 may filter out one of the objects. In some examples, server 102 filters out the object associated with a lower confidence value. In some examples, an object is filtered out if its corresponding confidence value is below a threshold and at least a portion of the image defined by its corresponding bounding box coincides with at least a portion of a bounding box corresponding to another object.

Server 102 may also determine whether an object, identified as of a particular type (e.g., a vehicle), was identified as an object in a previous image. Server 102 may perform such operations to determine whether, for example, the object (e.g., the vehicle) has moved. If server 102 determines the object has moved, server 102 may filter out the object (e.g., as identified by the more current image). The determination may be based on one or more of an amount of time that has elapsed between when the previous and current images of the objects were taken or received, and the bounding boxes associated with the previous and current identified objects.

For example, if the previous image corresponding to the previous object identified was taken within a threshold amount of time (e.g., 5 minutes) from when the current image corresponding to the current object identified was taken, and the bounding boxes corresponding to the two images are within a threshold distance from each other, server 102 may determine that the identified objects are the same and may filter out one of the objects (e.g., the one corresponding to the newer image). Server 102 may determine whether the bounding boxes are within a threshold distance from each other by, for example, determining the distance between the center points of each of the bounding boxes.

In some examples, server 102 may determine whether the bounding boxes are within a threshold distance from each other based on the differences of corresponding coordinate points for the bounding boxes. For example, server 102 may determine the difference in distance in the vertical direction (e.g., y coordinate) between the top-left coordinate points of the bounding boxes, and the difference in distance in the horizontal direction (e.g., y coordinate) between the top-left coordinates. Server 102 may determine that the bounding boxes are within a threshold distance from each other if the vertical distance is within a vertical threshold, and the horizontal distance is within a horizontal threshold. Server 102 may determine similar distance differences for the top-right, bottom-left, and bottom-right coordinates of the bounding boxes. In some examples, the server 102 may determine that the bounding boxes are within a threshold distance from each other if all vertical and horizontal differences for each of the coordinate points of the bounding box are within vertical and horizontal thresholds, respectively.

If an object was identified as a particular type and was not filtered out, server 102 may transmit a message (e.g., vehicle arrival message) to another computing device, such as one or more of associate computing device 110, 112, 144. The message may notify, for example, an associate of a retailer that a new vehicle has arrived at the location for which images where provided, such as a portion of a retailer's parking lot.

In some examples, in response to receiving the message, associate computing device 110, 112, 114 may present a notification to the associate (e.g., via a display unit) that a new customer has arrived at the location. The associate may then be aware that a new customer has arrived, and may proceed to the location to service the customer. In some examples, the associate computing device 110, 112, 114 may transmit a signal to server 102 when the associate is ready to service the customer. In response, server 102 may provide a signal to a display device, such as one visible by customers near the location, to cause the display device to display a message notifying customers that an associate is on their way (e.g., "Associate coming to assist you with your order.").

Figure 2:
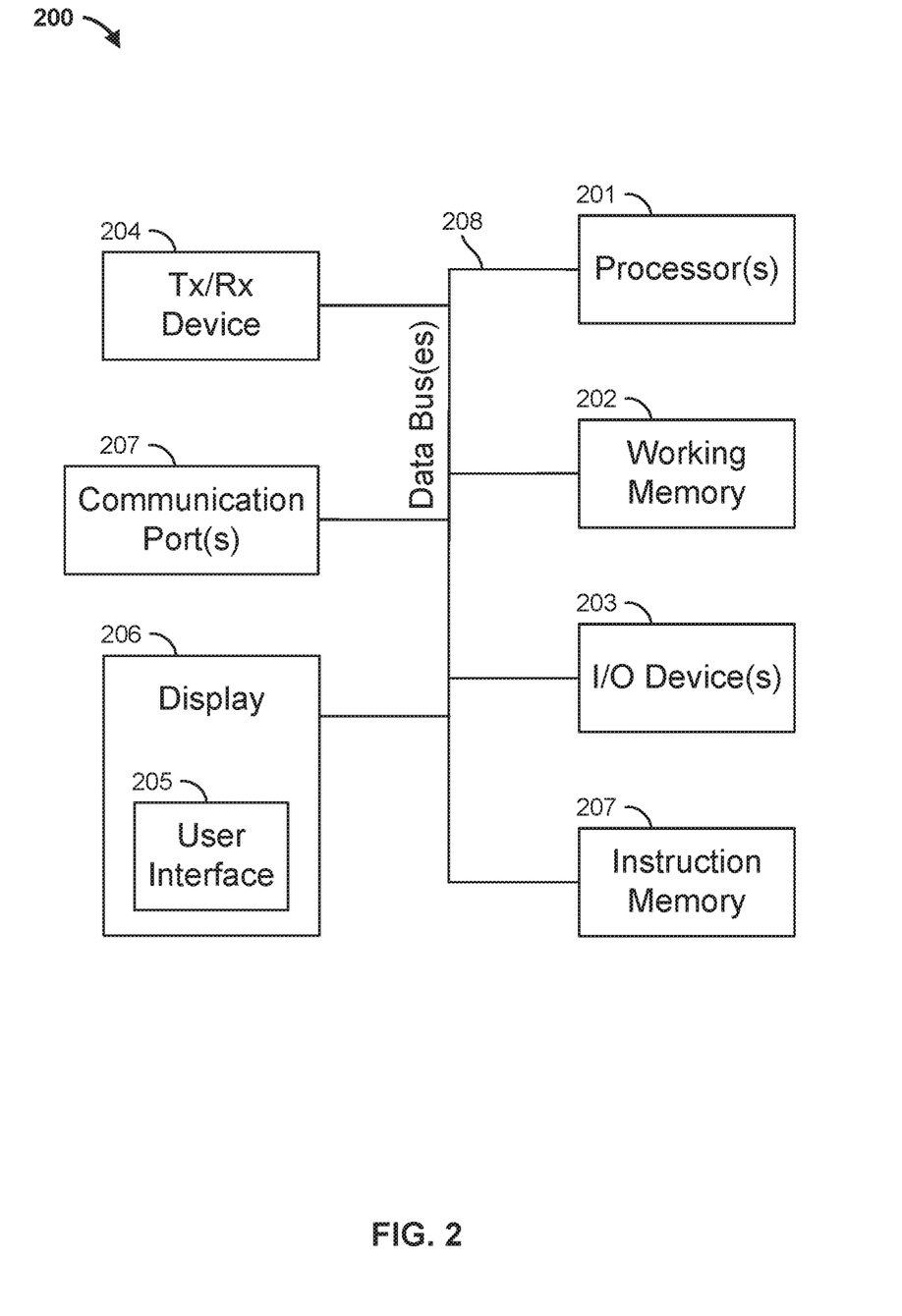
FIG. 2 is a block diagram of the server of the system of FIG. 1 in accordance with some embodiments.

FIG. 2 illustrates a more detailed view of the server 102 of FIG. 1. Server 102 can include one or more processors 201, working memory 202, one or more input/output devices 203, instruction memory 207, transceiver 204, and a display 206, all operatively coupled to one or more data buses 208. Data buses 208 allow for communication among the various devices. Data buses 208 can include wired, or wireless, communication channels.

Processor(s) 201 can include one or more distinct processors, each having one or more cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Processor(s) 201 are configured to perform a certain function or operation by executing code, stored on instruction memory 207, embodying the function or operation. For example, processor(s) 201 can be configured to perform one or more of any function, method, or operation disclosed herein.

Instruction memory 207 can store instructions that can be accessed (e.g., read) and executed by processor(s) 201. For example, instruction memory 207 can include read-only memory (ROM) such as electrically erasable programmable read-only memory (EEPROM), flash memory, a removable disk, CD-ROM, any non-volatile memory, or any other suitable memory.

Processor(s) 201 can store data to, and read data from, working memory 202. For example, processor(s) 201 can store a working set of instructions to working memory 202, such as instructions loaded from instruction memory 207. Processor(s) 201 can also use working memory 202 to store dynamic data created during the operation of server 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Display 206 can display user interface 205. User interface 205 can enable user interaction with server 102. In some examples, a user can interact with user interface 205 by engaging input-output devices 203. Display 206 can be any suitable display. For example, display 206 can be a computer monitor. In some examples, display 206 includes a touchscreen.

Transceiver 204 allows for communication with a network, such as a network of network(s) 118 of FIG. 1. In some examples, transceiver 204 is selected based on the type of network(s) 118 server 102 will be operating in. For example, transceiver 204 can allow for communications with a WiFi® network in the example when network 118 is a WiFi® network. Processor(s) 201 is operable to receive data from, or send data to, network 118 via transceiver 204.

Figure 3:
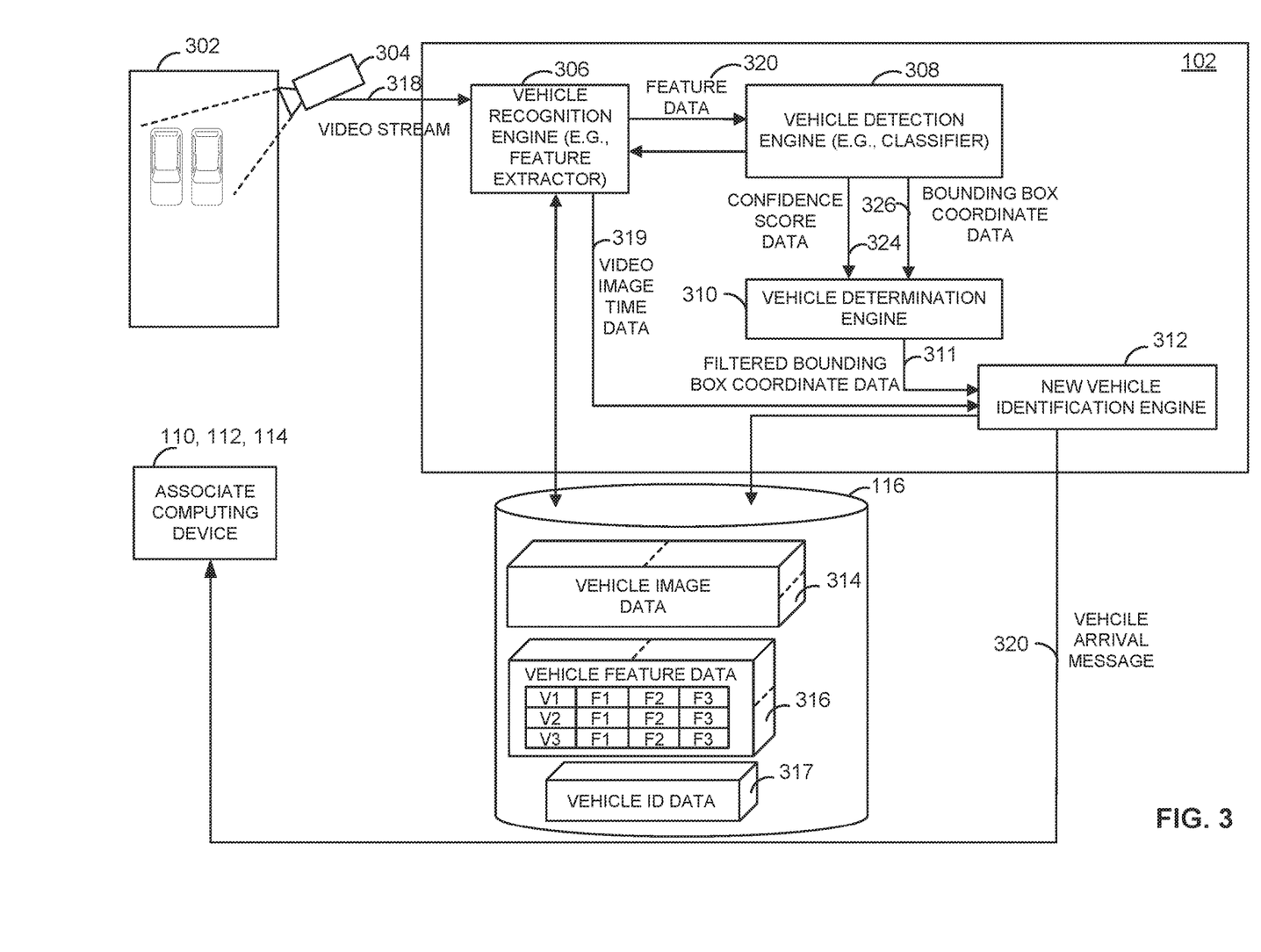
FIG. 3 is block diagram illustrating various portions of the system of FIG. 1 in accordance with some embodiments.

FIG. 3 illustrates a block diagram illustrating various portions of the vehicle notification system 100 of FIG. 1. In this example, video camera 304, which may be a security camera or any other suitable camera, is directed to location 302. Location 302 may be, for example, a pre-defined location, such as a portion of a retailer's parking lot where customers park their vehicles to await delivery of previously ordered items. For example, the items may have been ordered on the retailer's website, and the customer may have selected to pick the items up at the retailer's location. Video camera 304 provides a video stream 318 of location 302 to server 102.

As indicated in the figure, server 102 includes vehicle recognition engine 306, vehicle detection engine 308, vehicle determination engine 310, and new vehicle identification engine 312. In some examples, some or all of vehicle recognition engine 306, vehicle detection engine 308, vehicle determination engine 310, and new vehicle identification engine 312 are implemented in processor(s) 201 of FIG. 2, and in executable instructions executed by processor(s) 201. In some examples, some or all of vehicle recognition engine 306, vehicle detection engine 308, vehicle determination engine 310, and new vehicle identification engine 312 can be implemented in hardware, such as digital circuitry, FPGAs, ASICs, state machines, or any other suitable hardware.

Vehicle recognition engine 306 is operable to receive video stream 318 from video camera 304 and extract images from the video stream 318. Vehicle recognition engine 306 may store video image data 314 identifying the extracted video images in database 116. Vehicle recognition engine 306 may determine one or more features of objects, such as vehicles, from the extracted images. For example, vehicle recognition engine 306 may employ a feature extractor, such as one based on neural networks or artificial intelligence (AI), to detect one or more objects in the extracted images. Vehicle recognition engine 306 may store vehicle feature data 316 identifying the extracted features in database 116. For example, vehicle recognition engine 306 may store in database 116 vehicle feature data 316 that includes feature data for a first vehicle comprising a vehicle identification (ID) "V1" as well as an array of features, illustrated by "F1," "F2," and "F3." The array of features for a vehicle can include any number of features, and can be features extracted from one or more images of the received video stream 318. Vehicle recognition engine 306 may provide feature data 320, which identifies one or more detected features in the extracted images, to vehicle detection engine 308.

Vehicle detection engine 308 is operable to classify objects based on the feature data 320 received from vehicle recognition engine 306. For example, vehicle detection engine 308 may include a classifier, such as an RDF classifier, to classify the objects identified by feature data 320. Vehicle detection engine 308 may first be trained as a classifier to differentiate between vehicle and non-vehicle regions of a video image, for example. Vehicle detection engine 308 may determine which objects have been classified as of a particular type, e.g., vehicles, and may further identify a bounding box for each detected object. The bounding box may identify the location of each of the detected objects within the image. In some examples, the bounding box includes at least four coordinate points identifying an area within the received image containing an object. Vehicle detection engine 308 may also determine a confidence value for the classification of each of the detected objects. For example, vehicle detection engine 308 may determine a confidence value for a detected object based on how likely the detected object is a vehicle. Vehicle detection engine 308 may provide confidence score data 324 identifying confidence values for detected objects of a particular type (e.g., vehicles), and bounding box coordinate data 326 identifying a bounding box for each detected object of the particular type, to vehicle determination engine 310.

Vehicle determination engine 310 may be operable to receive confidence score data 324 and bounding box coordinate data 326 corresponding to detected objects, and may filter out (e.g., remove from consideration) one or more of the objects. For example, vehicle determination engine 310 may determine whether a confidence value, identified by confidence score data 324 and indicating how likely a detected object within a corresponding bounding box identified by bounding box coordinate data 326 is a vehicle, is below a threshold (e.g., 60%). If the confidence value is below the threshold, vehicle determination engine 310 may remove that object from consideration. In some examples, if the area of the image defined by a bounding box coincides with an area of the image defined by another bounding box, vehicle determination engine 310 may filter out one of the objects. In some examples, vehicle determination engine 310 filters out the object associated with a lower confidence value. In some examples, vehicle determination engine 310 filters out an object if its corresponding confidence value is below a threshold and at least a portion of the image defined by its corresponding bounding box coincides with at least a portion of a bounding box corresponding to another object. Vehicle detection engine 308 may then provide filtered bounding box coordinate data 311, which identifies bounding boxes for remaining objects (e.g., objects not filtered out by vehicle determination engine 310), to new vehicle identification engine 312.

New vehicle identification engine 312 may determine whether an object, identified as of a particular type (e.g., a vehicle), was identified as an object in a previous image. New vehicle identification engine 312 may determine whether, for example, the object (e.g., the vehicle) has moved. If new vehicle identification engine 312 determines the object has moved, new vehicle identification engine 312 may filter out the object (e.g., as identified by the more current image). New vehicle identification engine 312 may make the determination based on one or more of an amount of time that has elapsed between when the previous and current images of the objects were taken or received, and the bounding boxes, as identified by filtered bounding box coordinate data 311, associated with the previous and current identified objects. As discussed further below, database 116 stores vehicle data 314, which may include filtered bounding box coordinate data 311 and video image time data 319 associated with previously identified vehicles.

In some examples, new vehicle identification engine 312 determines the amount of time that has elapsed between when the previous and current images of the objects were taken based on the video image time data 319, which identifies a time (e.g., timestamp) each image was taken. For example, vehicle recognition engine 306 may determine the time of each video image based on data, such as meta data, contained within video stream 318. In some examples, new vehicle identification engine 312 determines whether a previous image, corresponding to a previously identified object, was taken within a threshold amount of time (e.g., 5 minutes) from when a current image, corresponding to a currently identified object, was taken.

New vehicle identification engine 312 may also determine whether the bounding boxes corresponding to the two images are within a threshold distance from each other. New vehicle identification engine 312 may determine whether the bounding boxes are within a threshold distance from each other by, for example, determining the distance between the center points of each of the bounding boxes. New vehicle identification engine 312 may determine that the identified objects are the same if the previous and current images were taken within the threshold amount of time, and the bounding boxes are within a threshold distance from each other. Server 102 may determine whether the bounding boxes are within a threshold distance from each other by, for example, determining the distance between the center points of each of the bounding boxes.

If new vehicle identification engine 312 determines that identified objects are the same, new vehicle identification engine 312 may filter out one of the objects (e.g., the one corresponding to the newer image). Otherwise, new vehicle identification engine 312 determines that the vehicle is a new arriving vehicle, and stores vehicle image data 314 identifying the vehicle in database 116. For example, vehicle image data 114 may include the filtered bounding box coordinate data 311 for the new vehicle object. Vehicle image data 114 may also include, for example, the video image time data 319 corresponding to the new vehicle object.

In some examples, if new vehicle identification engine 312 determines that a detected vehicle is a new arriving vehicle, new vehicle identification engine 312 may transmit a vehicle arrival message 320 to one or more of associate computing device 110, 112, 114. As such, a user of associate computing device 110, 112, 114 may be notified that a new vehicle has arrived to location 302. For example, associate computing devices 110, 112, 114 may alert an associate that the customer has arrived to location 302. For example, associate computing devices 110, 112, 114 may display a message alerting the user that the customer has arrived. In some examples, associate computing devices 110, 112, 114 vibrate or provide any other suitable notice to the user.

Figure 4:
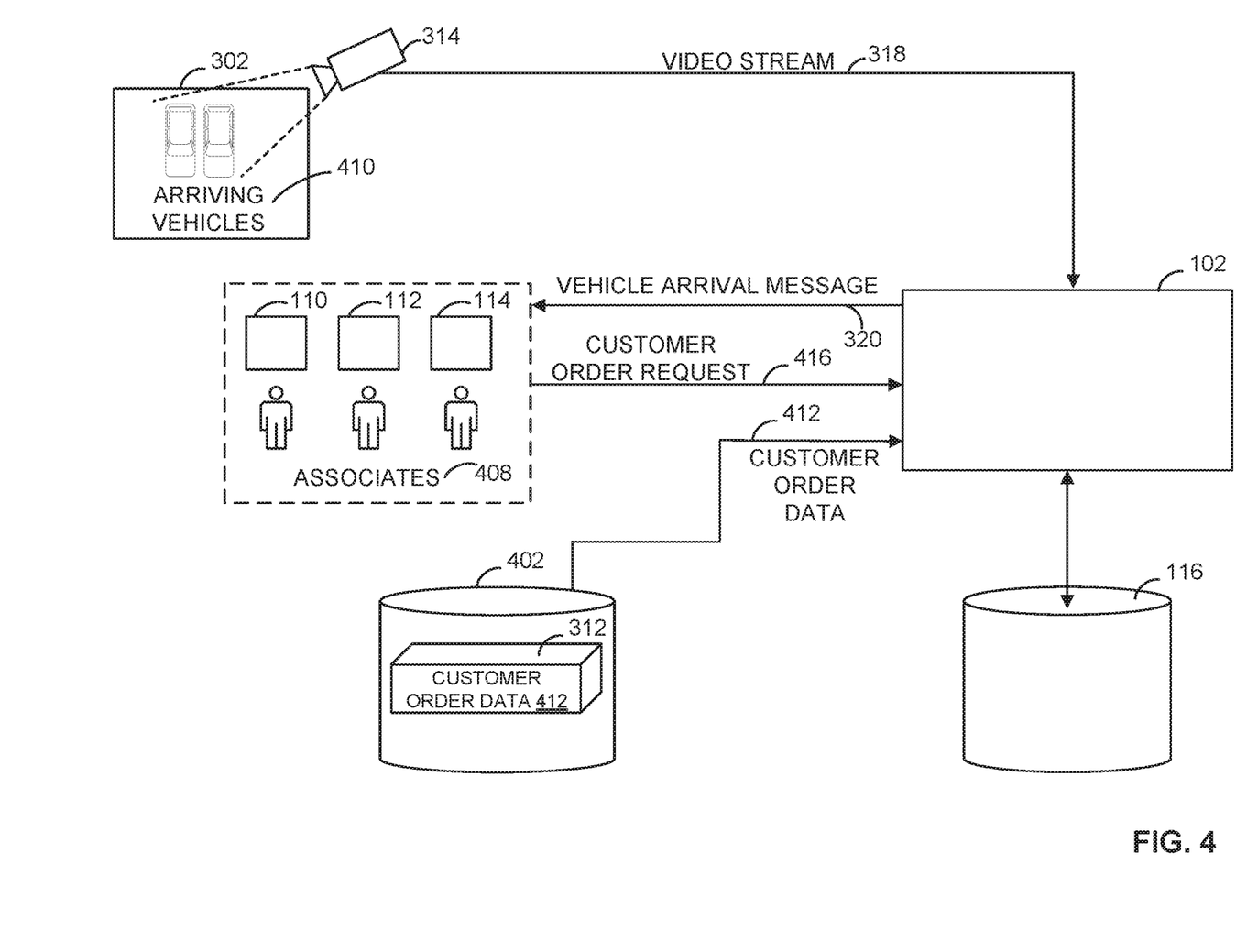
FIG. 4 is another block diagram illustrating various portions of the system of FIG. 1 in accordance with some embodiments.

FIG. 4 illustrates another block diagram illustrating various portions of the vehicle notification system 100 of FIG. 1. In this example, arriving vehicles 410 arrive at location 302, which is monitored by video camera 304. Video camera 304 provides video stream 318 to server 102, which includes one or more video images of location 302. Server 102 may continuously monitor video stream 318 to detect one or more vehicles, such as arriving vehicles 410. Server 102 may determine whether any of the arriving vehicles 410 are new arriving vehicles (e.g., they have not been reported previously). If server 102 determines an arriving vehicle is a new vehicle, server 102 may transmit a vehicle arrival message 320 to associate computing device 110, 112, 114 to notify one or more associates that a new vehicle has arrive and is awaiting service. The vehicle arrival message 320 may be, for example, an electronic email (email), a text message (e.g., short message service (SMS) message), or may be a mobile push of data to the associate computing device 110, 112, 114.

In some examples, in response to the vehicle arrival message 320, an associate identifies an order for a customer in arriving vehicles 410, and provides input to one or more of associate computing device 110, 112, 114 to retrieve the order from server 102. For example, the associate may ask the customer for the order number, and the associate may provide the order number to associate computing device 110, 112, 114 via, for example, an I/O device. Associate computing device 110, 112, 114 may then, in response to receiving the input, transmit a customer order request message 416 to server 102. In response, server 102 may obtain customer order data 312 from database 402, which identifies one or more orders for the customer. The associate may then provide the order contents to the customer.

As such, because associates 408 are notified once arriving vehicles 410 arrive to location 302 by vehicle notification system 100, the amount of time customers in arriving vehicles 410 might otherwise wait to have their ordered items delivered to them is reduced.

Figure 5:
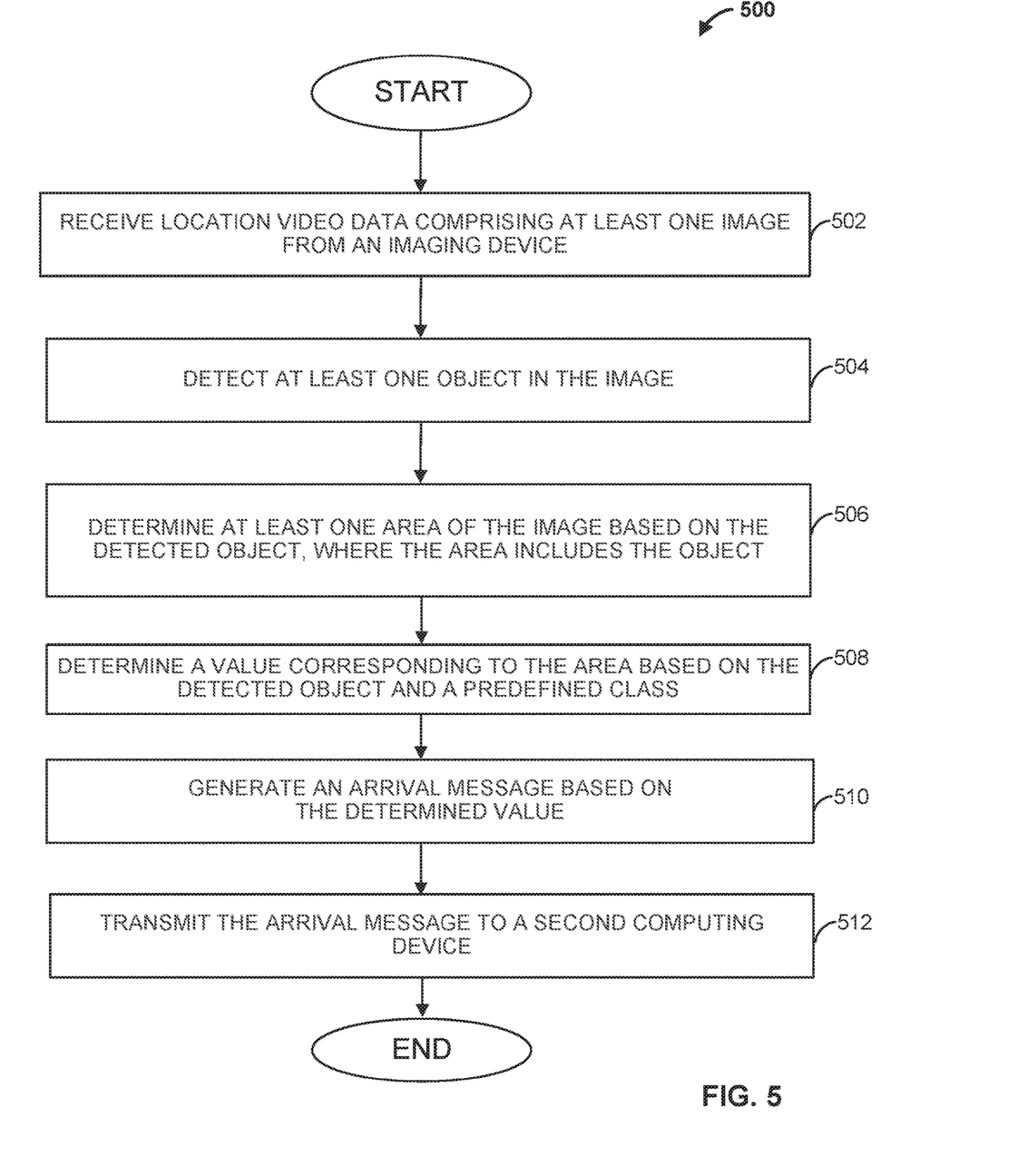
FIG. 5 is a flowchart of an example method that can be carried out by the server of FIG. 1 in accordance with some embodiments.

FIG. 5 is a flowchart of an example method that can be carried out by a server, such as server 102 of FIG. 1. Beginning at step 502, location video data is received. The location video data comprises at least one image from a camera directed to a pre-defined location. For example, server 102 may receive location video data from video camera 304, which may be directed at location 302. At step 504, at least one object within an image is detected based on the location video data. For example, server 102 may detect one or more objects, such as vehicles, in video stream 318.

Proceeding to step 506, an area of the image is determined based on the detected object. For example, server 102 may determine a bounding box corresponding to the detected object. At step 508, a value is determined based on the detected object and a predefined class, such as vehicles. For example, server 102 may determine a confidence value for the detected object indicating how likely the object detected is of a particular type, such as a vehicle.

At step 510, an arrival message is generated based on the value. For example, server 102 may generate a vehicle arrival message 320 to be transmitted to one or more of associate computing devices 110, 112, 114 if the determined confidence value is beyond (e.g., over) a threshold. At step 512, the arrival message is transmitted. For example, server 102 may transmit the vehicle arrival message 320 to one or more of associate computing devices 110, 112, 114.

Figure 6:
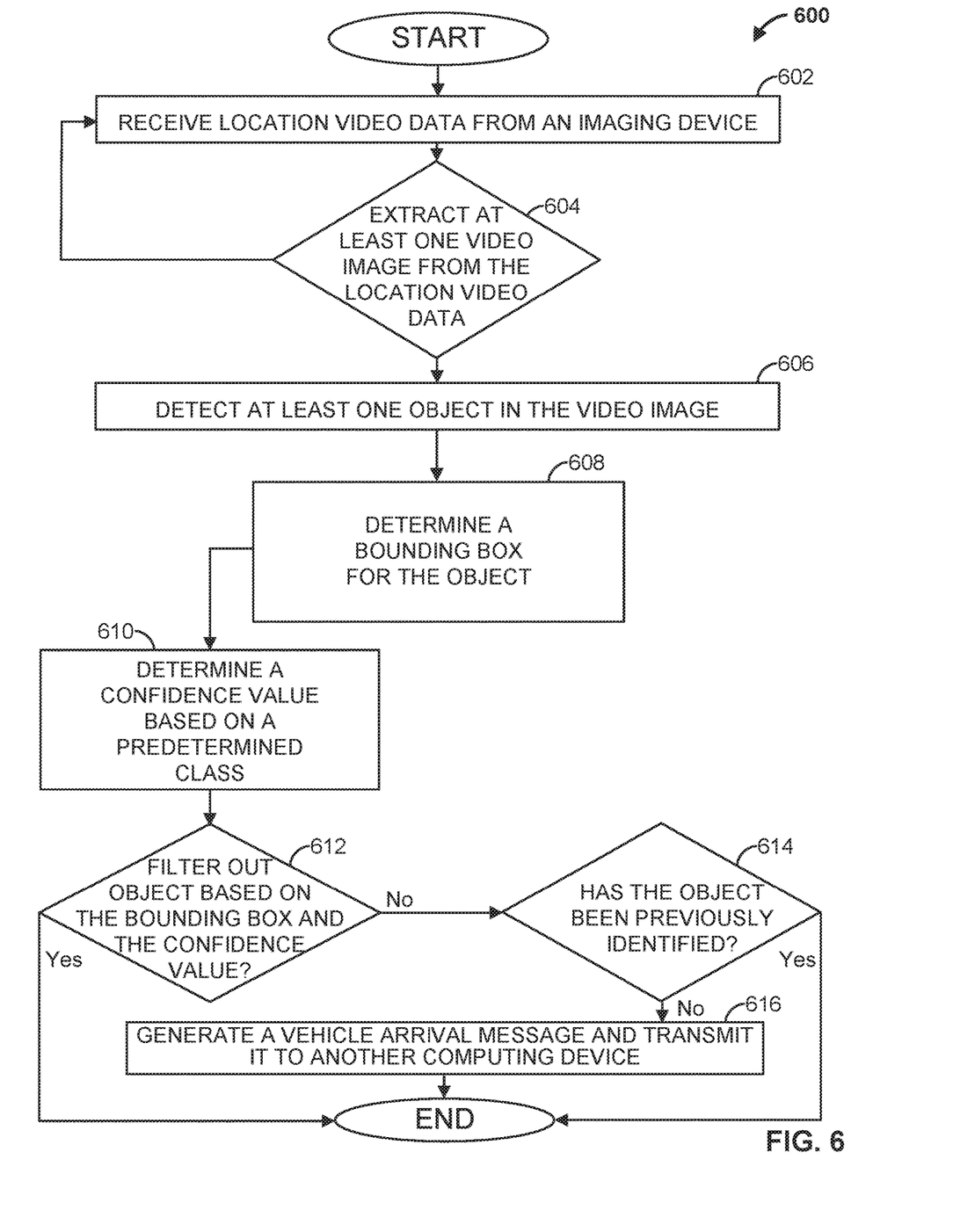
FIG. 6 is a flowchart of another example method that can be carried out by the server of FIG. 1 in accordance with some embodiments.

FIG. 6 is a flowchart of another example method that can be carried out by a server, such as server 102 of FIG. 1. Begging at step 602, location video data is received. The location video data comprises at least one image from a video camera directed to a pre-defined location. For example, server 102 may receive location video data from video camera 304, which may be directed at location 302. At step 604, a video image is extracted from the location video data. At step 606, an object is detected in the video image. For example, server 102 may apply a feature extraction algorithm to the location video data to detect the object. At step 608, a bounding box for the detected object is determined. For example, the bounding box may include coordinate points that identify an area of the image that includes the detected object. At step 610, a confidence value is determined based on a predetermined class. The confidence value may be based on how likely the detected object within the bouncing box is a vehicle, for example.

At step 612, a determination is made as to whether the detected object should be filtered out based on the bounding box and the confidence value. For example, server 102 may filter out the detected object if the confidence value is below a threshold and at least a portion of the image defined by the bounding box coincides with at least a portion of a bounding box corresponding to another object. If the detected object is filtered out, the method ends. Otherwise, the method proceeds to step 614.

At step 614, a determination is made as to whether the object detected has been previously identified. For example, server 102 may determine whether the detected object is a same vehicle that was previously reported within a previous amount of time (e.g., 5 minutes). If the detected object has been previously identified, the method ends. Otherwise, the method proceeds to step 616.

At step 616, an arrival message is generated and transmitted to another computing device. For example, server 102 may generate a vehicle arrival message 320, and transmit it to one or more of associate computing devices 110, 112, 114. The method then ends.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable (e.g., computer-readable) storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
a first computing device comprising at least one processor, the first computing device configured to:
receive a video stream comprising at least one image from an imaging device;
detect at least one object in the at least one image, wherein the at least one object comprises a first object and a second object;
determine at least one area of the at least one image based on the detected at least one object, wherein the at least one area comprises a first area comprising the first object and a second area comprising the second object;
determine a first value corresponding to the first area of the at least one image based on the detected first object and a predefined class;
determine a second value corresponding to the second area of the at least one image based on the detected second object and the predefined class;
determine an overlap of the first area with the second area;
determine, based on the overlap, a larger value of the first value and the second value;
identify a selected object of the first object and the second object, wherein the larger value corresponds to a selected area comprising the selected object;
determine that the selected object is a new object detected in the video stream by determining that:
a distance between the selected area and a previously selected area determined from any of a plurality of previous images in the video stream is beyond a threshold distance, and
an amount of time from when each of the plurality of previous images was captured to when the at least one image was captured is within a threshold amount of time;
generate an arrival message based on the new object detected in the video stream; and
transmit the arrival message to a second computing device.

2. The system of claim 1, wherein the first computing device is further configured to classify the at least one object in the at least one image.

3. The system of claim 2, wherein determining the first value corresponding to the first area of the at least one image comprises determining whether the first object is classified as the predefined class.

4. The system of claim 3, wherein the predefined class includes vehicles.

5. The system of claim 1, wherein the first computing device is further configured to determine that the first value corresponding to the first area of the at least one image is beyond a predefined threshold.

6. The system of claim 1, wherein the first computing device is further configured to:
determine that at least one of the first value and the second value is not beyond a predefined threshold and that at least one of the first value and the second value is beyond the predefined threshold; and
generate the arrival message indicating the first object or the second object corresponding to the at least one of the first value and the second value that is beyond the predefined threshold.

7. The system of claim 1, wherein the first computing device is further configured to determine whether the at least one object moved based on the at least one area and a previously determined area determined from a previous image.

8. The system of claim 7, further comprising determining that the at least one object moved based on a distance between the at least one area and the previously determined area.

9. The system of claim 7, further comprising determining that the at least one object moved based on an amount of time from when the previous image was captured to when the at least one image was captured.

10. A method comprising:
receiving a video stream comprising at least one image from an imaging device;
detecting at least one object in the at least one image, wherein the at least one object comprises a first object and a second object;
determining at least one area of the at least one image based on the detected at least one object, wherein the at least one area comprises a first area comprising the first object and a second area comprising the second object;
determining a first value corresponding to the first area of the at least one image based on the detected first object and a predefined class;
determining a second value corresponding to the second area of the at least one image based on the detected second object and the predefined class;
determining an overlap of the first area with the second area;
determining, based on the overlap, a larger value of the first value and the second value;
identifying a selected object of the first object and the second object, wherein the larger value corresponds to a selected area comprising the selected object;
determining that the selected object is a new object detected in the video stream by determining that:
a distance between the selected area and a previously selected area determined from any of a plurality of previous images in the video stream is beyond a threshold distance, and
an amount of time from when each of the plurality of previous images was captured to when the at least one image was captured is within a threshold amount of time;
generating an arrival message based on the new object detected in the video stream; and
transmitting the arrival message to a second computing device.

11. The method of claim 10 further comprising classifying the at least one object in the at least one image.

12. The method of claim 10 wherein determining the first value corresponding to the first area of the at least one image comprises determining whether the first object is classified as the predefined class.

13. The method of claim 12 wherein the predefined class includes vehicles.

14. The method of claim 10 further comprising determining that the first value corresponding to the first area of the at least one image is beyond a predefined threshold.

15. The method of claim 10 further comprising:
determining that at least one of the first value and the second value is not beyond a predefined threshold and that at least one of the first value and the second value is beyond the predefined threshold; and
generating the arrival message indicating the first object or the second object corresponding to the at least one of the first value and the second value that is beyond the predefined threshold.

16. A non-transitory, computer-readable storage medium comprising executable instructions that, when executed by one or more processors, cause the one or more processors to:
receive a video stream comprising at least one image from an imaging device;
detect at least one object in the at least one image, wherein the at least one object comprises a first object and a second object;
determine at least one area of the at least one image based on the detected at least one object, wherein the at least one area comprises a first area comprising the first object and a second area comprising the second object;
determine a first value corresponding to the first area of the at least one image based on the detected first object and a predefined class;
determine a second value corresponding to the second area of the at least one image based on the detected second object and the predefined class;
determine an overlap of the first area with the second area;
determine, based on the overlap, a larger value of the first value and the second value;
identify a selected object of the first object and the second object, wherein the larger value corresponds to a selected area comprising the selected object;
determine that the selected object is a new object detected in the video stream by determining that:
a distance between the selected area and a previously selected area determined from any of a plurality of previous images in the video stream is beyond a threshold distance, and
an amount of time from when each of the plurality of previous images was captured to when the at least one image was captured is within a threshold amount of time;
generate an arrival message based on the new object detected in the video stream; and
transmit the arrival message to a second computing device.

17. The computer-readable storage medium of claim 16 wherein the executable instructions, when executed by the one or more processors, cause the one or more processors to classify the at least one object in the at least one image.

18. The computer-readable storage medium of claim 16 wherein the executable instructions, when executed by the one or more processors, cause the one or more processors to determine whether the first object is classified as the predefined class.

19. The computer-readable storage medium of claim 16 wherein the executable instructions, when executed by the one or more processors, cause the one or more processors to determine that the first value corresponding to the first area of the at least one image is beyond a predefined threshold.

20. The computer-readable storage medium of claim 16 wherein the executable instructions, when executed by the one or more processors, cause the one or more processors to:
determine that at least one of the first value and the second value is not beyond a predefined threshold and that at least one of the first value and the second value is beyond the predefined threshold; and
generate the arrival message indicating the first object or the second object corresponding to the at least one of the first value and the second value that is beyond the predefined threshold.

* * * * *